United States Patent
Liu et al.

(10) Patent No.: US 7,095,215 B2
(45) Date of Patent: Aug. 22, 2006

(54) REAL-TIME VOLTAGE DETECTION AND PROTECTION CIRCUIT FOR PFC BOOST CONVERTERS

(75) Inventors: Chi Fai Liu, Yuen Long (HK); Jose Agerico Moncada, North Point (HK)

(73) Assignee: Astec International Limited, Hong Kong (HK)

( * ) Notice: Subject to any disclaimer, the term of this patent is extended or adjusted under 35 U.S.C. 154(b) by 0 days.

(21) Appl. No.: 10/861,964

(22) Filed: Jun. 4, 2004

(65) Prior Publication Data

US 2005/0269999 A1    Dec. 8, 2005

(51) Int. Cl.
*G05F 1/613* (2006.01)

(52) U.S. Cl. .................... 323/222; 323/284; 323/299

(58) Field of Classification Search ............... 323/222, 323/223, 282, 284, 285, 299, 205, 207; 361/18; 363/52, 53, 89
See application file for complete search history.

(56) References Cited

U.S. PATENT DOCUMENTS

| | | | |
|---|---|---|---|
| 4,353,114 A | 10/1982 | Saleh | 363/21 |
| 4,598,351 A | 7/1986 | Fair et al. | 363/49 |
| 4,621,313 A | 11/1986 | Kiteley | 363/49 |
| 5,006,975 A | 4/1991 | Neufeld | 363/80 |
| 5,233,508 A | 8/1993 | Yamamura et al. | 363/49 |
| 5,349,284 A | 9/1994 | Whittle | 323/207 |
| 5,726,845 A * | 3/1998 | Ho | 361/86 |
| 5,910,891 A * | 6/1999 | Jo | 363/89 |
| 6,055,167 A | 4/2000 | Shamkovich et al. | 363/52 |
| 6,128,205 A | 10/2000 | Bernd et al. | 363/89 |
| 6,256,209 B1 | 7/2001 | Gurwicz et al. | 363/17 |
| 6,377,480 B1 | 4/2002 | Sase et al. | 363/49 |
| 6,388,902 B1 | 5/2002 | Yasumura | 363/21.02 |
| 6,487,059 B1 | 11/2002 | Bontempo et al. | 361/90 |
| 6,525,517 B1 | 2/2003 | Hojo et al. | 323/316 |
| 6,552,517 B1 | 4/2003 | Ribellino et al. | 323/282 |
| 2003/0006744 A1 | 1/2003 | Bostrom | 323/283 |

* cited by examiner

*Primary Examiner*—Gary L Laxton
(74) *Attorney, Agent, or Firm*—Nixon Peabody LLP

(57) ABSTRACT

A circuit for providing protection for power factor correction (PFC) boost converters from conditions such as input voltage surges that can otherwise cause failure. The circuit also prevents unnecessary down time of the boost converter after a power failure or on startup. The circuit detects the real time rectified input voltage and provides a real time comparison of the detected input voltage and the output voltage. The boost function is controlled as a function of the comparison. The circuit enables the boost converter to start and restart more quickly, even before the output voltage becomes stabilized, since boost is permitted as soon as the output voltage exceeds the real time sampled input voltage. By enabling boost during this period, the circuit eliminates the need to wait at least a few cycle times until the output voltage is higher than the peak of rectified input voltage.

16 Claims, 3 Drawing Sheets

FIG. 3A
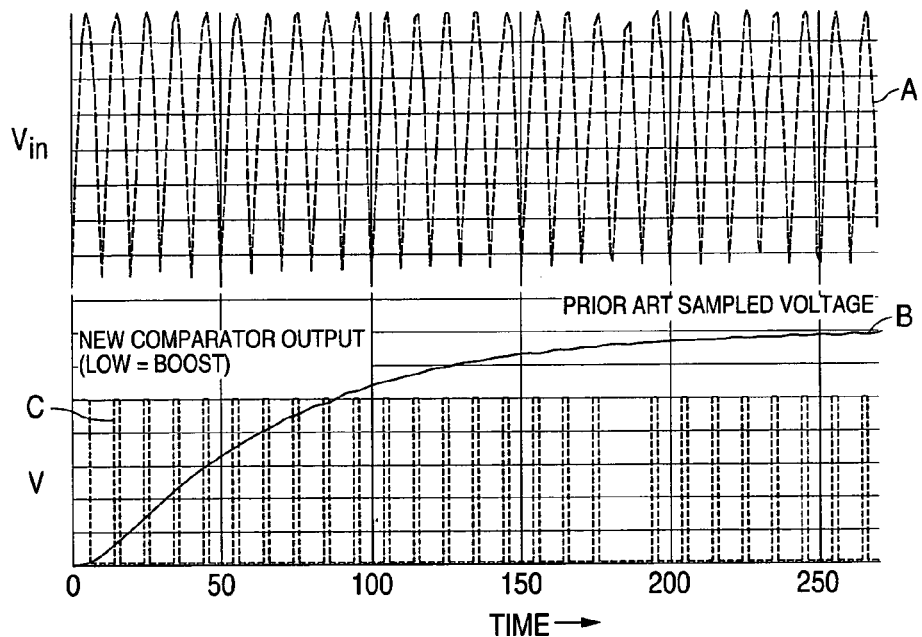
FIG. 3B
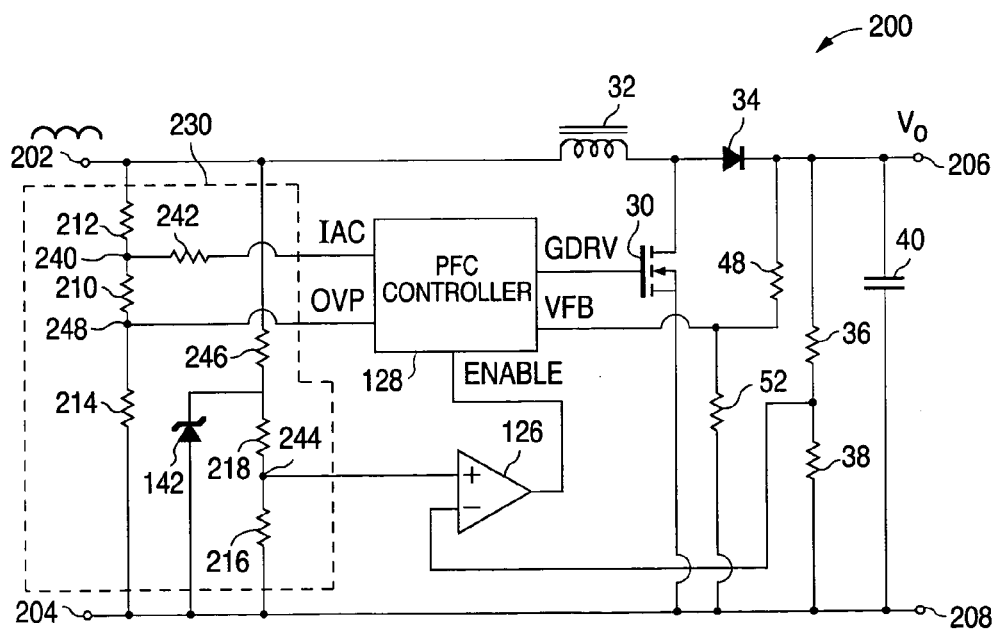
FIG. 4

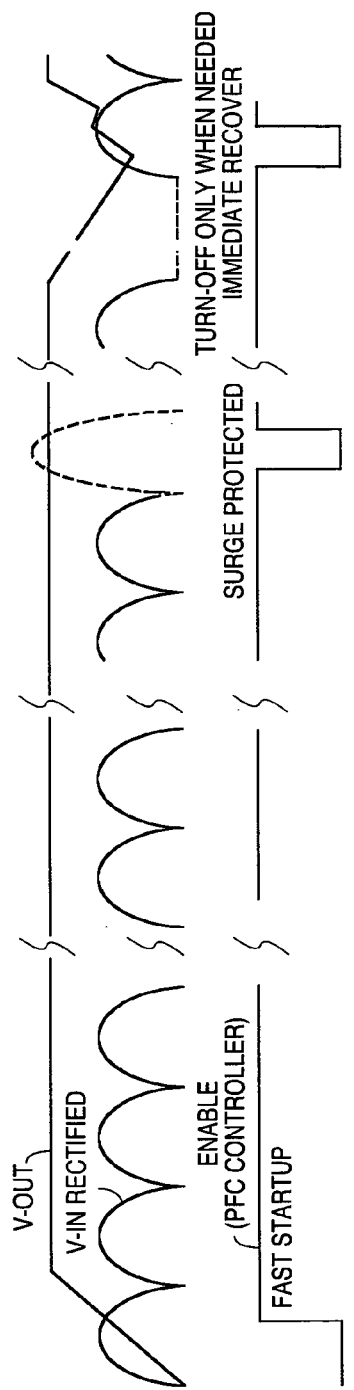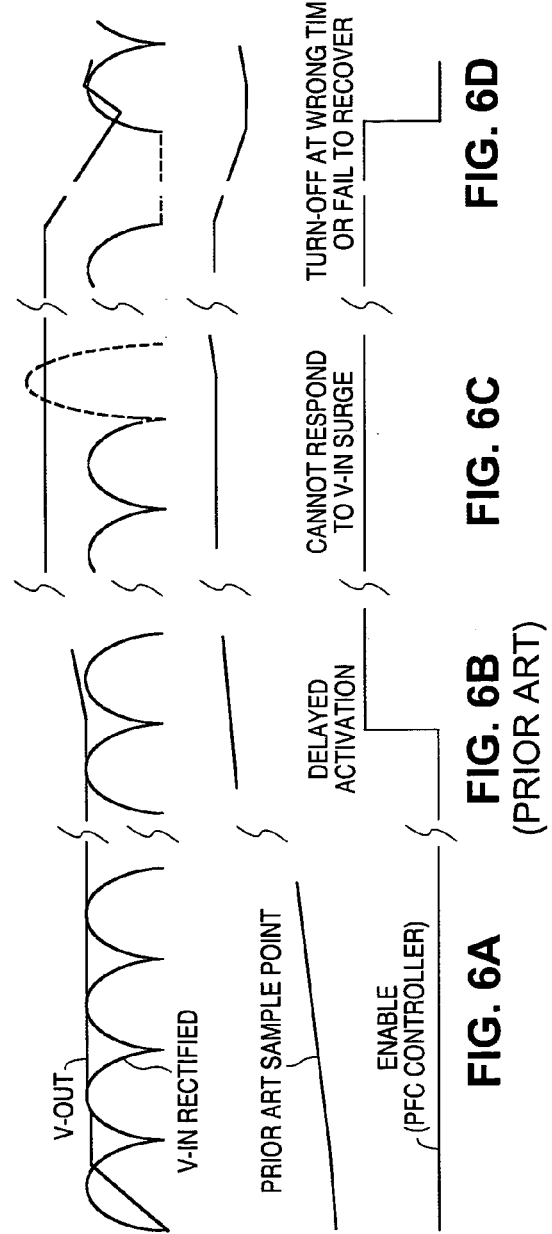

REAL-TIME VOLTAGE DETECTION AND PROTECTION CIRCUIT FOR PFC BOOST CONVERTERS

FIELD OF INVENTION

The present invention relates in general to power factor correction circuits, and more particularly, to a power factor correction circuit for a boost-type converter that controls the boost function for protection of the converter during selected failure conditions and faster recovery thereafter.

BACKGROUND OF INVENTION

Power supplies for generating a predetermined voltage/current for a given application can make abnormal demands on the line supply caused by the harmonic content of the current drawn from the line. In particular, a high third harmonic content can give a large neutral current which can place unacceptable loads on the line supply transformer. To compensate for this problem, power factor correction (PFC) circuits have been developed to reduce the harmonic content. A conventional AC to DC power converter typically includes a boost converter for power factor correction of the input bulk voltage generated from the AC input power source and a DC to DC converter to convert the unregulated bulk voltage into an output voltage that satisfies the voltage regulation and transient response requirements of the power converter. The power factor correction circuit modifies the current waveform to reduce the harmonics and thus enable the current waveform to more closely define a sinusoidal waveform that is in phase with the line voltage.

FIG. 1 shows a schematic diagram of a prior art PFC boost converter 10. Included in converter 10 is an input voltage sampling circuit that includes two filter capacitors 18 and 24. A rectified input line voltage $V_{in}$ from a conventional bridge rectifier (not shown) is applied at input terminals 2 and 4. The PFC boost converter includes a boost (choke) inductor 32, an electronic switch 30, a diode 34, and a PFC controller 28 to produce an output voltage across capacitor 40 connected between output terminals 6 and 8. The boost converter 10 uses a switching technique to boost the rectified input voltage to a regulated DC output voltage for delivery to a load (not shown) via terminals 6 and 8. Switch 30 is typically a FET having a control input as seen in FIG. 1.

PFC controller 28 has an output pin (GDRV) connected to the control input of switch 30 to control the state of the switch 30. PFC controller 28 includes an enable input pin (ENABLE) that is used to enable the switching of switch 30. PFC controller 28 has a voltage feedback input pin (VFB) to which is applied a voltage from a voltage divider formed by series resistors 48 and 52 connected across the output terminals 6 and 8. PFC controller 28 compares a portion of the boosted output DC voltage from the terminals 6 and 8 to a reference voltage input (not shown) to maintain the desired regulated output DC voltage. In addition to this regulation function, the purpose of the PFC controller 28 is to modify the input current waveform to reduce the harmonics and thus enable the current waveform to more closely define a sinusoidal waveform that is in phase with the line voltage. PFC controller 28 has an input AC (IAC) pin. The IAC pin for PFC controller 28 may be connected to the rectified input voltage at terminals 2 and 4 using a voltage divider circuit comprising resistors 12 and 14. The IAC pin input generates, via a multiplier, a current reference for a current amplifier in PFC controller 28 (details not shown). One exemplary PFC controller for use in converter 10 is manufactured by STMicroelectronics under their model number L4981. The switching frequency for the L4981 is in the range of 100 kHz. Other suitable controller devices are available from other manufacturers. For simplicity of explanation, the circuit has been shown based upon the L4981 PFC controller.

A comparator 26 is included to provide a signal input to the enable input of the PFC controller 28 as a function of the input voltage and output voltage. For the L4981 PFC controller, the enable input is also referred to as the sync input. The output voltage between terminals 6 and 8 is divided by a voltage divider formed by series resistors 36 and 38 to generate a voltage applied to the negative input of comparator 26. The positive input of comparator 26 receives a sampled input voltage at a node 44 from an input voltage sampling circuit. For the prior art converter 10, the input voltage sampling circuit comprises two filter capacitors 18 and 24. The sampling circuit includes a series combination of a resistor 16 and the filter capacitor 18 connected between input terminals 2 and 4. Resistor 16 and filter capacitor 18 are connected together at node 46. A resistor 20 is connected in series with a parallel combination of a resistor 22 and filter capacitor 24 between node 46 and terminal 4.

In general, power factor correction circuits are designed to work over all usual line voltages used worldwide, typically 65 VAC–265 VAC and provide a well regulated output voltage for input to a bulk converter of standard design which performs the required voltage/current conversion for a particular application. It is desirable to provide a protection circuit, also referred to herein as an inhibit circuit, to protect the boost converter from conditions such as input voltage surges that can otherwise cause failure, and to prevent unnecessary down time of the boost converter after a power failure or on startup. For one aspect of such protection, it is desired that the converter quickly recover after a momentary loss of the input voltage so that the down time of the power supply is reduced.

The prior art protection circuit comprises the comparator 26 and the above-discussed circuits that provide inputs thereto. In operation, capacitors 18 and 24 of converter 10 determine the average of the input voltage sine wave, such that the output voltage is compared by comparator 26 to a filtered, averaged, non-real-time voltage representation of the rectified input voltage. That is, the circuit is designed to determine the peak of the input sine wave voltage by using a capacitor filter to first find the "average" voltage on the input, and to only allow boost to begin when the output voltage rises near to, or above, this averaged input peak voltage. The result is excessive downtime for the PFC boost circuit. For recovery after a power loss, for example, converter 10 starts up slowly due to the fact that the circuit waits at least a few cycle times until the output voltage is higher than the input sine wave voltage and only thereafter allows boost to start. In the case of short glitches appearing on the input power line, the protection circuit for converter 10 fails to adequately protect the PFC boost converter since the response time of the filtered circuit is too slow to provide the required protection.

A need exists, therefore, for the PFC boost converter to recover more quickly after a momentary loss of the input voltage so that the downtime of the power supply is reduced.

In the case of a sudden high voltage surge on the input voltage line, the converter 10 in FIG. 1 has the drawback that it causes the PFC to latch in order to avoid damage to the power supply unit. The converter in FIG. 1 latches the PFC to prevent saturation of the boost choke and to avoid damage to the power supply unit. Thus, in the case of high voltage surges at the input, the prior art circuit shuts down the operation of the unit rather than providing a way in which circuit operation can be maintained during such conditions. A circuit is therefore needed to quickly inhibit the boost function of the PFC controller thereby disabling boost and protecting the circuit from burning out. Although PFC boost converters using PFC controllers such as the L4981 are fast enough to enable boost during fractions of the input voltage half-sine wave, no prior art circuit has utilized this feature to speed up boost response. A circuit is therefore needed to enable boost to be provided in real time in order to reduce the down time of the power supply, and to also protect the PFC boost converter in real time when short high voltage glitches appear on the input voltage line.

SUMMARY OF THE INVENTION

The present invention overcomes the drawbacks of known circuits by providing a circuit having a real-time fast comparison circuit for comparing the input rectified AC instantaneous voltage against the output voltage in a PFC boost-type converter. The boost function of a PFC controller in the boost converter is enabled or disabled as a function of the output of the comparison circuit whose inputs are unfiltered representations of the input sine wave voltage and output DC voltage of the PFC boost converter. The circuit according a preferred embodiment includes a real-time input voltage detection circuit and complementary protection circuit for enabling protection of the converter against input glitches and output surges, and enabling near-immediate recovery of boost operation after momentary failures so as to avoid unnecessary down time.

Broadly stated, the present invention provides a circuit for providing protection for a boost converter during power disturbance conditions, said boost converter having a switch, an inductor, a diode, two input terminals to which an input DC voltage is coupled and two output terminals where the output DC power is provided, a pulse width modulated PFC controller for providing a boost function for controlling the duty cycle of said switch for controlling said output voltage, comprising: a detection circuit for detecting said input voltage instantaneously such that a real time sample of said input voltage is detected; a comparator circuit for comparing said real time input voltage sample and said output voltage; wherein the boost function of the PFC circuit is enabled or disabled as a function of the output of said comparator circuit so as to disable said boost function during power line disturbances and to reenable said boost function so as to reduce the down time for said converter.

BRIEF DESCRIPTION OF THE DRAWINGS

The foregoing aspects and the attendant advantages of the present invention will become more readily appreciated by reference to the following detailed description, when taken in conjunction with the accompanying drawings, wherein:

FIG. 3A shows an exemplary waveform for the rectified input voltage;

FIG. 3B shows waveforms for the comparator output for the circuit of FIG. 2 for enabling or disabling the boost function and a waveform to illustrate how inclusion of filter capacitors in the circuit of FIG. 1 introduces a substantial delay before enabling the boost function after the rectified input voltage shown of FIG. 3A has started or restarted;

FIG. 4 is a schematic diagram of an exemplary PFC boost-type converter having a circuit according to a preferred embodiment of the present invention;

FIGS. 5A–5D illustrates exemplary waveforms for the rectified input voltage, output voltage, and comparator output for the circuit of FIG. 4 under selected conditions; and FIGS. 6A–6D illustrates exemplary waveforms for the rectified input voltage, output voltage, and comparator output for the prior art circuit of FIG. 1 under selected conditions.

Reference symbols or names are used in the Figures to indicate certain components, aspects or features shown therein, with reference symbols common to more than one Figure indicating like components, aspects or features shown therein.

DETAILED DESCRIPTION OF THE INVENTION

Figure 1:
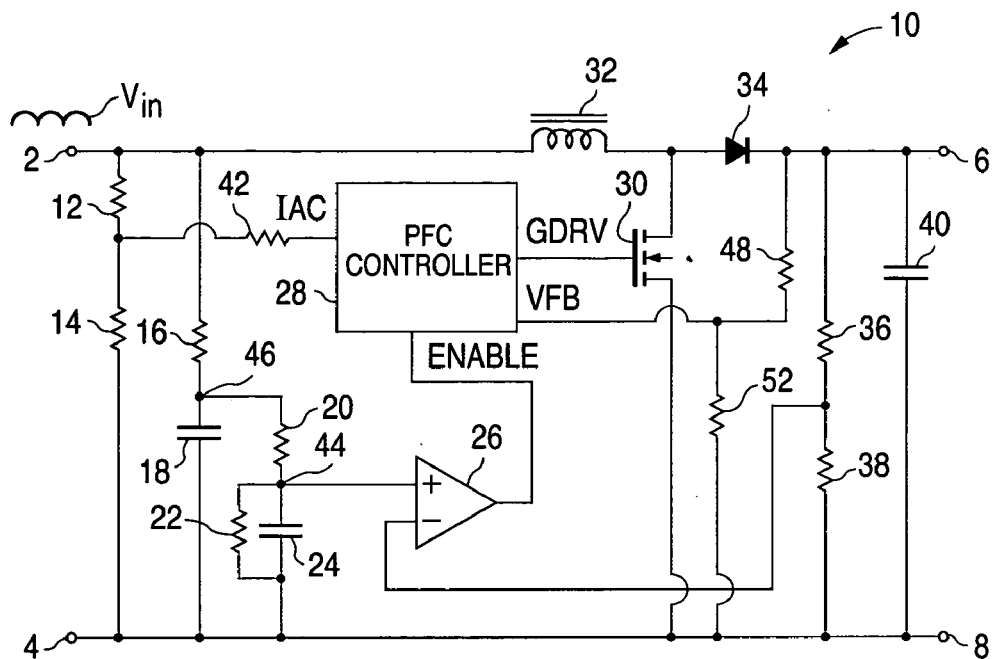
FIG. 1 shows a schematic diagram of a prior art boost converter.

A convention boost converter as described above uses a switching technique to boost a rectified input line voltage to a regulated DC output voltage for delivery to a load. For power factor correction, the conventional boost converter includes a PFC controller for modifying the current waveform to reduce the harmonics and thus enable the current waveform to more closely define a sinusoidal waveform that is in phase with the line voltage. The prior art boost converter shown in FIG. 1 includes an inhibit circuit to turn off the boost function under certain conditions. The prior art circuit uses filter capacitors to provide a filtered, averaged, non-real-time voltage representation of the rectified input voltage to compare to the output voltage to determine if the boost function should be inhibited, i.e. disabled. Among other drawbacks, the inclusion of filter capacitors in the circuit of FIG. 1 introduce a substantial delay before enabling the boost function after the rectified input voltage shown of FIG. 3A has recovered after a failure. According to the present invention, the inhibit function is caused to operate in a novel way. For example, instead of using filter capacitors, the present invention includes a non-filtered real-time detection of the input voltage for the comparison which has the advantage of avoiding unnecessary delays and avoiding unnecessarily inhibiting of the boost function of the PFC, enabling it to operate continuously during certain power disturbances.

Figure 2:
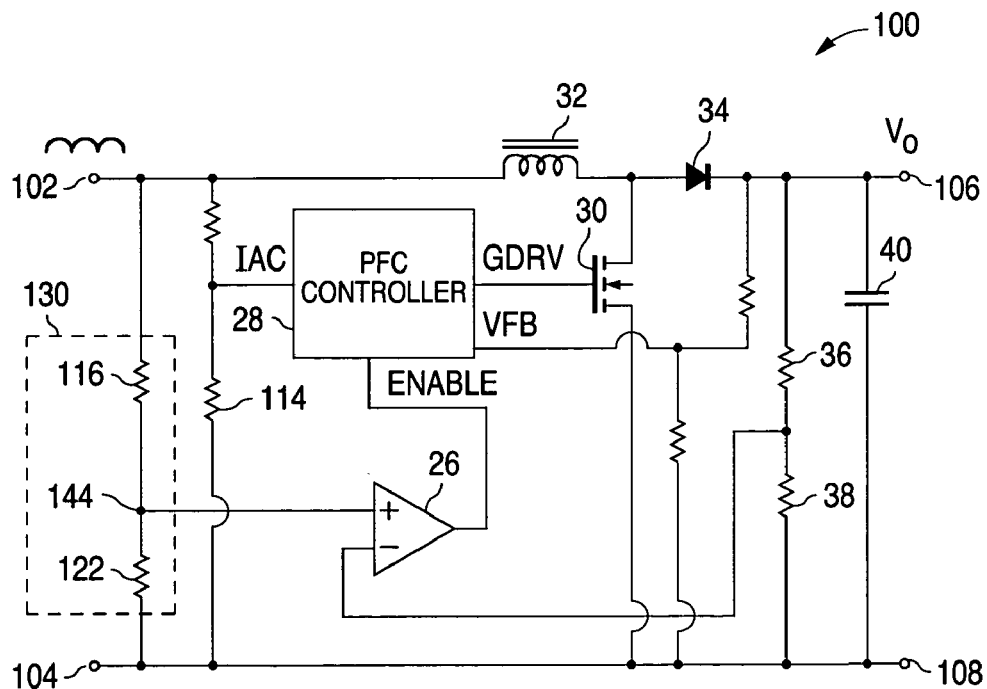
FIG. 2 is a schematic diagram of an exemplary PFC boost-type converter having the circuit according to an embodiment of the present invention.

FIG. 2 is a schematic diagram of an exemplary PFC boost-type converter 100 having a real-time voltage detection circuit according to an embodiment of the present invention. A rectified input line voltage $V_{in}$ from a conventional bridge rectifier (not shown) is applied at input terminals 102 and 104. The power factor correcting boost converter includes a boost inductor 32, a switch 30, a diode 34, and a PFC controller 28 to produce an output voltage across capacitor 40 connected between output terminals 106 and 108. The boost converter 100 uses a switching technique to boost the rectified input voltage to a regulated DC output voltage for delivery to a load (not shown) via terminals 106 and 108. Switch 30 is typically a FET having a control input. The control input of the switch 30 is connected to the output of a pulse width modulated PFC controller 28.

PFC controller 28 has an output pin (GDRV) connected to the control input of switch 30 to control the state of the switch 30. PFC controller 28 includes an enable input pin (ENABLE) that is used to enable the switching of switch 30. PFC controller 28 has a voltage feedback input pin (VFB) to which is applied a voltage from a voltage divider formed by series resistors 48 and 52 connected across the output terminals 106 and 108. PFC controller 28 compares a portion of the boosted output DC voltage from the terminals 106 and 108 to a reference voltage input (not shown) to maintain the desired regulated output DC voltage. In addition to this regulation function, the purpose of the PFC controller 28 is to modify the input current waveform to reduce the harmonics and thus enable the current waveform to more closely define a sinusoidal waveform that is in phase with the line voltage. PFC controller 28 has an input AC (IAC) pin. The IAC pin for PFC controller 28 may be connected to the rectified input voltage at terminals 102 and 104 using a voltage divider circuit comprising resistors 112 and 114. The IAC pin input generates, via a multiplier, a current reference for a current amplifier in PFC controller 28 (details not shown). One exemplary PFC controller for converter 100 is manufactured by STMicroelectronics under their model number L4981. The switching frequency for the L4981 is in the range of 100 kHz. Other suitable controller devices are available from other manufacturers. For simplicity of explanation, the circuit of FIG. 2 has been shown based upon the L4981 PFC controller.

A comparator 26 is included to provide a signal input to the PFC controller 28 as a function of the input voltage and output voltage. According to the embodiment shown in FIG. 2, the output of comparator 26 is coupled to the enable input of the PFC controller 28. For the L4981 PFC controller, the enable input is also referred to as the sync input. The output voltage between terminals 106 and 108 is divided by a voltage divider formed by series resistors 36 and 38 to generate a voltage applied to the negative input of comparator 26.

The positive input of comparator 26 in FIG. 2 receives an input voltage signal from input voltage sampling circuit 130. The input voltage sampling circuit 130 includes a voltage divider formed by series resistors 116 and 122. The rectified input voltage is divided by the voltage divider formed by series resistors 116 and 122 to generate a voltage at a node 144. Node 144 is connected to the positive input of comparator 26. In contrast to the circuit in FIG. 1, the circuit in FIG. 2 for providing the positive input to comparator 26, as a function of the input voltage, does not include any filter capacitors.

The circuit in FIG. 2 provides a fast comparator circuit such that in a PFC boost converter, boost will be inhibited if the momentary input voltage is found to be near or higher than the DC voltage at the output terminals. Boosting is permitted whenever the output voltage exceeds the real time input voltage. As a result, the output bulk cap is charged up faster and the boost is sustained so as to enable the converter to more rapidly attain a full-load readiness state.

FIG. 3A shows an exemplary waveform for the rectified input voltage. FIG. 3B shows waveforms for the comparator output for the circuit of FIG. 2 for enabling or disabling the boost function and a waveform to illustrate how inclusion of filter capacitors in the circuit of FIG. 1 introduces a substantial delay before enabling the boost function after the rectified input voltage shown of FIG. 3A has started or restarted. As shown in waveform B, for the prior art circuit of FIG. 1, the sampled input voltage for the comparator 26 in converter 10 has a slow startup after the disturbance. This slow startup is due to the time required for charging of the filter capacitors 18 and 24 in converter 10. For the embodiment shown in FIG. 2 according to the present invention, the comparator 26 output is shown at waveform C in FIG. 3B, where a low voltage indicates boost activation. As seen in FIG. 3B, for FIG. 2 the boost (re)commences within a single half-cycle time, whereas the prior art circuit of FIG. 1 requires approximately a 200 ms delay before the sampled voltage stabilizes enough so that boosting can be resumed.

FIG. 4 is a schematic diagram of an exemplary PFC boost-type converter 200 having a detection circuit 230 according to a preferred embodiment of the present invention. In FIG. 4, the detection circuit 230 replaces the input voltage sampling circuit 130 in the converter 100 in FIG. 2. Detection circuit 230 includes a voltage divider formed by series resistors 246, 218, and 216. The rectified input voltage is divided by the voltage divider formed by series resistors 246, 218, and 216. Resistors 246 and 218 are connected in series at the node 246. Resistors 218 and 216 are connected in series at the node 244. Node 244 is connected to the positive input of comparator 126. In contrast to the prior circuit in FIG. 1, the circuit in FIG. 4 provides a real time sampling of the input voltage to the positive input to comparator 126. FIG. 4 does not include any filter capacitors as are included in the circuit in FIG. 1.

The detection circuit 230 includes a zener diode 142 having an anode connected to input terminal 204 and a cathode connected to the junction of resistor 246 and resistor 218 at node 246. The zener diode 142 in the detection circuit 230 clamps the voltage for disabling the comparator function when the rectified input voltage approaches a predetermined threshold so as to avoid unnecessary shut-down of the converter due to the circuit erroneously interpreting that the output voltage has fallen too far. For instance, the zener diode 142 functions to prevent the comparator from disabling the boost when the input voltage is too close to the output voltage at its peak due to noise spikes on the input voltage. In an exemplary embodiment, the zener diode 142 functions as a voltage clamp for limiting the detection voltage above 250 VAC. This voltage clamping prevents the boost converter from shutting down unnecessarily while operating at the high input boundary of around 264 VAC when the output voltage $V_o$ may then compare too low. Zener diode 142 also limits the operation of the circuit to within international AC voltage supply range so as to facilitate factory safety testing at higher than operation voltage levels.

Detection circuit 230 also provides high input voltage sensing feature for disabling the PFC controller 128 when the input voltage approaches a pre-determined threshold. This sensing feature is necessary since the zener diode 142 renders the comparison circuit ineffective in protecting the PFC boost converter above its set voltage. For this feature, the detection circuit 230 connects to the voltage protection (OVP) input of PFC controller 128 is utilized as is described in further detail below. The detection circuit 230 includes a voltage divider formed by series resistors 212, 210, and 214. The rectified input voltage is divided by the voltage divider formed by series resistors 212, 210, and 214. Resistors 212 and 210 are connected in series at the node 240. The divided voltage at node 240 is coupled via a resistor 242 to the IAC input of PFC controller 128. Resistors 210 and 214 are connected in series at the node 248. Node 248 is connected to the OVP input of PFC controller 128.

In FIG. 4, a divided rectified input voltage at node 248 is connected to the OVP input of the PFC controller 128 for high input voltage sensing to disable the PFC when the input voltage approaches a next pre-determined threshold. In an exemplary embodiment, above 264 VAC, the unit is disabled from boosting by use of the OVP input of the L4981 PFC controller 128, as shown in FIG. 4, at input voltages of higher than 264 VAC.

FIGS. 5A–5D illustrates exemplary waveforms for the rectified input voltage, the output voltage, and for the comparator output coupled to the enable input of the PFC controller, for the circuit in FIG. 4 under selected conditions. For comparison, FIGS. 6A–6D illustrates exemplary waveforms for the rectified input voltage, output voltage, and for the comparator output coupled to the enable input of the PFC controller for the prior art circuit in FIG. 1 under the selected conditions.

FIG. 5A illustrates exemplary waveforms for the circuit in FIG. 4 for a startup or restart condition of the rectified input voltage.

In FIGS. 5A–D and 6A–D, a high level indicates the boost signal is enabled. As seen in FIG. 5A, without the filter capacitors of the prior art circuit, the circuit in FIG. 4 provides a much faster recovery for enabling the boost signal after startup. The circuit in FIG. 4 enables the PFC controller to starts and restarts faster without waiting through the duration of at least a few cycle times, since boosting is permitted whenever the output voltage exceeds the real time sampled input voltage. FIG. 6B shows the delayed enabling and activation of the boost signal for the prior art circuit in FIG. 1.

With the real-time protection provided by the present invention, it is possible to startup the boost converter with a full load since it will boost under all conditions except when the real time sampled input voltage exceeds the output voltage. This protection is not provided for prior art PFC circuits since, although PFC boost converters using PFC controllers such as the L4981 are fast enough to enable boost during fractions of the input voltage half-sine wave, no prior art circuit has utilized this feature to speed up boost response.

FIGS. 5C and 6C illustrate a condition where a voltage surge occurs on the input power line. As shown in FIG. 5C, if short voltage surges or glitches appear on input power line such that the input voltage exceeds the output voltage, the circuit of the present invention senses the condition and quickly inhibits the boost function to protect the circuit from burning out. In this case, as shown in FIG. 6C, the response time of the prior art filtered circuit is too slow for protection in such conditions.

FIGS. 5D and 6D illustrate a condition when the rectified input voltage fails for a momentary period. As shown in FIG. 5D, the circuit of the present invention functions to disable the boost only when needed so as to provide immediate recovery. As seen in FIG. 6D, for the prior art circuit in FIG. 1, the response of the circuit is too slow such that the boost is either turned off at the wrong time or fails to recover.

Alternatively, a resistor (not shown) may be included between node 144 in FIG. 2 and the positive input of comparator 126 and another resistor (not shown) may be included between the positive input and the output of comparator 126 to providing hysteresis for the comparator to avoid chattering at marginal conditions.

The present invention enables a PFC boost-type converter to have much higher service reliability especially in unstable power line conditions.

Having disclosed exemplary embodiments, modifications and variations may be made to the disclosed embodiments while remaining within the scope of the invention as described by the following claims.

What is claimed is:

1. A circuit for providing protection for a boost converter during power disturbance conditions affecting the boost converter's input voltage, said boost converter having a switch for controlling current through an inductor, two input terminals to which an input voltage is coupled and two output terminals where the output DC power is provided, a pulse width modulated PFC controller for providing a boost function for controlling the duty cycle of said switch, comprising:
   a detection circuit for detecting said input voltage instantaneously such that a real time sample of said input voltage is detected; and
   a comparator circuit for comparing said real time input voltage sample and said output voltage; said comparator circuit having an output coupled to said PFC controller such that the boost function of the PFC controller is controlled as a function of said comparator circuit output; wherein the boost function is inhibited so long as said real time input voltage sample exceeds said output voltage and said boost function is enabled as soon as said real time input voltage sample is less than the output voltage.

2. The circuit of claim 1, wherein the input voltage is an unregulated voltage sine wave generated by a rectifier fed from a source of AC power.

3. The circuit of claim 2, wherein said comparator circuit disables said boost function during a momentary loss of input voltage and reenables said boost function as soon as said output voltage exceeds said rectified input voltage.

4. The circuit of claim 1, further comprising a zener diode for clamping said detected input voltage for disabling said comparator circuit when the rectified input voltage exceeds a predetermined threshold voltage.

5. The circuit of claim 4, wherein said zener diode clamps the detection voltage at 250 VAC.

6. In a system having a boost converter comprising an inductor, a capacitor and a switch, said boost converter having two input terminals to which a rectified input voltage is coupled and two output terminals where the output DC voltage is provided, said switch having a control input and being controlled such that when said switch is open, current through said inductor is maintained by a path provided by said switch, and having a pulse width modulator (PWM) providing power factor correction (PFC) and having at least one control input and an output designed to provide control of the state of said switch; a control circuit coupled between one of said control inputs of said PWM and said input and output terminals of said boost converter for controlling said PWM, comprising:
   a detection circuit for detecting said rectified input voltage instantaneously such that a real time sample of said input voltage is detected; and
   a comparator circuit for comparing said real time input voltage sample and a feedback signal indicative of said output DC voltage to said output of said detection circuit; said comparator circuit outputs a control signal to said PWM such that the boost function of the PWM is controlled as a function of the output of said comparator circuit; wherein the boost function is inhibited so long as said real time input voltage sample exceeds said output voltage and said boost function is enabled as soon as said real time input voltage sample is less than the output voltage such that said boost function is reenabled more quickly after a power line disturbance conditions affecting the input voltage.

7. The control circuit of claim 6, wherein said feedback signal is a divided voltage from a voltage divider connected across said output terminals.

8. The control circuit of claim 6, wherein said boost function is enabled by the output of said comparator circuit in no more than one half-cycle time of said rectified input voltage after said rectified input voltage is restored after a failure.

9. The control circuit of claim 6, wherein said comparator circuit comprises a comparator having a positive input and a negative input.

10. The control circuit of claim 9, wherein said feedback signal is coupled to negative input of said comparator and said output of said detection circuit is coupled to said positive input of said comparator.

11. The control circuit of claim 9, wherein said detection circuit comprises a first voltage divider formed by a first resistor, a second resistor, and a third resistor connected in series between said input terminals and providing a divided voltage to said positive input of said comparator; said first and second resistors are connected at a first node, and said second and third resistors are connected at a second node.

12. The control circuit of claim 11, further comprising a zener diode for limiting the voltage input to said positive input of said comparator, said zener diode is connected in parallel across said second and third resistors.

13. The control circuit of claim 12, further comprises an input voltage divider formed by a fourth resistor, a fifth resistor, and a sixth resistor connected in series between said input terminals; said fourth and fifth resistors are connected at a third node, and said fifth and sixth resistors are connected at a fourth node;

wherein said PWM has a control input connected via a seventh resistor to said third node; and wherein said PWM has an overvoltage protection input connected to said fourth node; wherein said switch is turned off when said overvoltage protection input is active.

14. The control circuit of claim 13, wherein said input voltage divider has resistor values such that said overvoltage protection input is active when said input voltage is above 264 VAC.

15. The control circuit of claim 12, wherein said zener diode has an anode connected to said input terminal connected to one end of said third resistor, and a cathode connected to said first node at the junction of said first and second resistors; said zener diode for limiting the output of said detection circuit for providing surge protection for preventing unnecessary shut-down of said converter.

16. The control circuit of claim 15, wherein said zener diode limits the detection voltage to 250 VAC.

* * * * *